United States Patent
Engdahl et al.

(10) Patent No.: US 8,002,994 B2
(45) Date of Patent: Aug. 23, 2011

(54) METHOD AND APPARATUS FOR THICKENING LIME MUD IN A DISC FILTER

(75) Inventors: Holger Engdahl, Savonlinna (FI); Jouni Jäntti, Savonlinna (FI); Markku Lankinen, Savonlinna (FI); Antti Mattelmäki, Kotka (FI); Simo Suutari, Summa (FI); Mika Kottila, Klaukkala (FI)

(73) Assignee: Andritz Oy, Helsinki (FI)

( * ) Notice: Subject to any disclaimer, the term of this patent is extended or adjusted under 35 U.S.C. 154(b) by 519 days.

(21) Appl. No.: 11/791,480

(22) PCT Filed: Nov. 24, 2005

(86) PCT No.: PCT/FI2005/000507
§ 371 (c)(1),
(2), (4) Date: Jul. 9, 2007

(87) PCT Pub. No.: WO2006/056649
PCT Pub. Date: Jun. 1, 2006

(65) Prior Publication Data
US 2008/0164222 A1    Jul. 10, 2008

(30) Foreign Application Priority Data
Nov. 25, 2004  (FI) .................................. 20041518

(51) Int. Cl.
*B01D 37/00* (2006.01)

(52) U.S. Cl. ........ 210/768; 210/772; 210/331; 210/332; 210/346; 210/347; 210/396; 210/406

(58) Field of Classification Search ................. None
See application file for complete search history.

(56) References Cited

U.S. PATENT DOCUMENTS

| 1,084,383 A | * | 1/1914 | Alinder | 210/402 |
| 1,689,534 A | * | 10/1928 | Richter | 162/30.11 |
| 2,894,632 A | * | 7/1959 | Myers | 210/331 |

(Continued)

FOREIGN PATENT DOCUMENTS

EP    0 683 686 B1    11/1995

(Continued)

OTHER PUBLICATIONS

International Search Report mailed Apr. 21, 2006 in PCT/FI2005/000507.

(Continued)

*Primary Examiner* — Robert James Popovics
(74) *Attorney, Agent, or Firm* — Nixon & Vanderhye P.C.

(57) ABSTRACT

The present invention relates to a method of treating lime mud slurry being generated in a causticizing process in a pulp mill in a disc filter, in which method the lime mud is fed in the filter, thickened on the filter discs and removed from the filter discs. The lime mud is treated in at least two stages in one and the same disc filter in such a way that the lime mud slurry entering the filter is fed onto only a part of the filter discs, on which lime mud is thickened and removed from the discs, and the removed lime mud is re-slurried in liquid, and the lime mud slurry thus obtained is fed onto a second part of the filter discs, on which lime mud is thickened and removed from the filter and led into a subsequent process stage. The invention also relates to an apparatus.

19 Claims, 2 Drawing Sheets

U.S. PATENT DOCUMENTS

Figure 1:
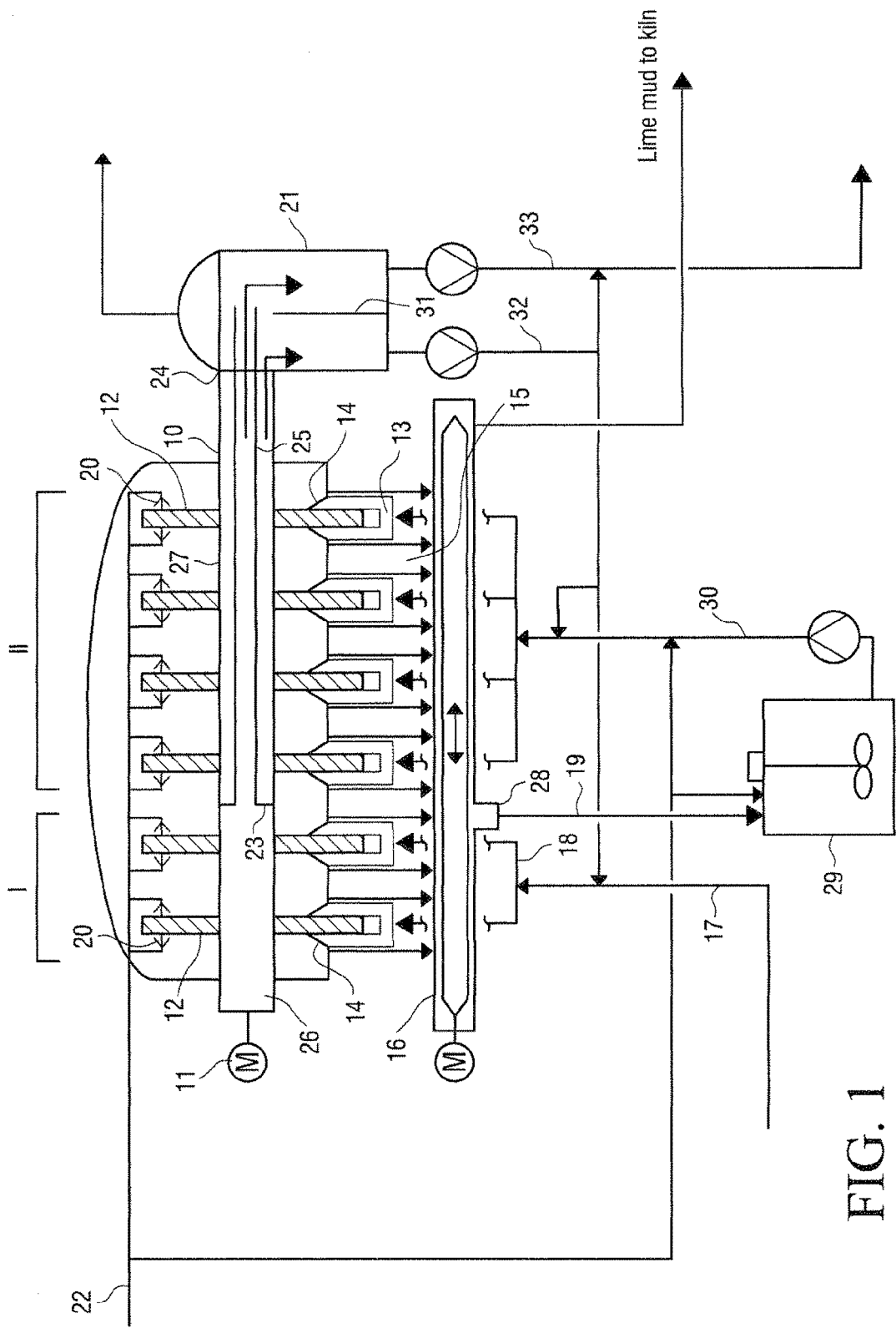

| Patent No. | | | Date | Inventor | Class |
|---|---|---|---|---|---|
| 2,932,402 | A | * | 4/1960 | Logne et al. | 210/383 |
| 3,029,948 | A | * | 4/1962 | Mckay | 210/771 |
| 3,061,477 | A | * | 10/1962 | Lavallee | 127/9 |
| 3,064,817 | A | * | 11/1962 | Van Der Werff | 210/232 |
| 3,193,105 | A | * | 7/1965 | Putnam | 210/331 |
| 3,201,921 | A | * | 8/1965 | Heyes | 95/92 |
| 3,245,536 | A | * | 4/1966 | Mckay | 210/784 |
| 3,250,396 | A | * | 5/1966 | Gayring et al. | 210/331 |
| 3,255,888 | A | * | 6/1966 | Balfour | 210/330 |
| 3,258,391 | A | * | 6/1966 | Cornell et al. | 162/30.11 |
| 3,269,941 | A | * | 8/1966 | Le Compte et al. | 210/749 |
| 3,283,906 | A | * | 11/1966 | Crane et al. | 210/232 |
| 3,452,874 | A | * | 7/1969 | Keller et al. | 210/331 |
| 3,471,026 | A | * | 10/1969 | Riker | 210/327 |
| 3,531,370 | A | * | 9/1970 | Gould | 162/33 |
| 3,540,597 | A | * | 11/1970 | Gaudfrin | 210/331 |
| 3,587,257 | A | | 6/1971 | Hurter | |
| 3,639,206 | A | * | 2/1972 | Spruill | 162/29 |
| 3,833,464 | A | * | 9/1974 | Rolfe | 162/29 |
| 3,948,779 | A | * | 4/1976 | Jackson | 210/331 |
| 4,123,363 | A | * | 10/1978 | Koskinen | 210/331 |
| 4,136,028 | A | * | 1/1979 | Toivonen | 210/780 |
| 4,138,338 | A | * | 2/1979 | Velinsky et al. | 210/327 |
| 4,152,267 | A | * | 5/1979 | Davis et al. | 210/331 |
| 4,193,875 | A | * | 3/1980 | Stahl et al. | 210/330 |
| 4,207,141 | A | * | 6/1980 | Seymour | 162/49 |
| 4,328,099 | A | * | 5/1982 | Krappmann et al. | 210/232 |
| 4,676,901 | A | * | 6/1987 | Ragnegard | 210/331 |
| 4,695,381 | A | * | 9/1987 | Ragnegard | 210/403 |
| 4,929,355 | A | * | 5/1990 | Ragneg.ang.rd et al. | 210/784 |
| 4,936,990 | A | * | 6/1990 | Brunsell et al. | 210/331 |
| 4,936,992 | A | * | 6/1990 | Nilsson | 210/331 |
| 4,999,104 | A | * | 3/1991 | Krieger | 210/196 |
| 5,143,555 | A | * | 9/1992 | Brady | 134/42 |
| 5,145,556 | A | * | 9/1992 | Westerberg et al. | 162/29 |
| 5,151,176 | A | * | 9/1992 | Strid et al. | 210/178 |
| 5,227,064 | A | * | 7/1993 | Strid | 210/327 |
| 5,275,024 | A | | 1/1994 | Parks | |
| 5,290,454 | A | * | 3/1994 | Dorica et al. | 210/710 |
| 5,641,402 | A | | 6/1997 | Kokonen et al. | |
| 5,705,031 | A | * | 1/1998 | Angevine | 162/30.11 |
| 5,788,813 | A | * | 8/1998 | Engdahl et al. | 162/29 |
| 5,851,392 | A | * | 12/1998 | Brady, Jr. | 210/396 |
| 5,897,788 | A | * | 4/1999 | Ketolainen et al. | 210/784 |
| 5,900,158 | A | * | 5/1999 | Ruokolainen et al. | 210/772 |
| 5,968,372 | A | * | 10/1999 | Martensson et al. | 210/741 |
| 6,063,294 | A | * | 5/2000 | Martensson et al. | 210/739 |
| 6,074,522 | A | * | 6/2000 | Seymour | 162/49 |
| 6,258,282 | B1 | * | 7/2001 | Strid et al. | 210/780 |
| 6,793,809 | B2 | * | 9/2004 | Ingelman et al. | 210/143 |
| 6,833,077 | B2 | * | 12/2004 | Flanagan | 210/772 |
| 7,005,067 | B2 | * | 2/2006 | Flanagan | 210/248 |
| 7,686,964 | B2 | * | 3/2010 | Lownertz | 210/772 |
| 2002/0166821 | A1 | * | 11/2002 | Flanagan | 210/784 |
| 2002/0166822 | A1 | * | 11/2002 | Flanagan | 210/784 |
| 2004/0045913 | A1 | * | 3/2004 | Flanagan | 210/780 |
| 2004/0069721 | A1 | * | 4/2004 | Ingelman et al. | 210/767 |
| 2004/0084380 | A1 | * | 5/2004 | Kicinski | 210/748 |
| 2005/0067348 | A1 | * | 3/2005 | Logan et al. | 210/609 |
| 2005/0103727 | A1 | * | 5/2005 | Flanagan | 210/772 |
| 2007/0221345 | A1 | * | 9/2007 | Lownertz | 162/16 |
| 2007/0251891 | A1 | * | 11/2007 | Lownertz et al. | 210/791 |
| 2008/0164222 | A1 | * | 7/2008 | Engdahl et al. | 210/772 |
| 2010/0213142 | A1 | * | 8/2010 | Andersson et al. | 210/784 |
| 2011/0000834 | A1 | * | 1/2011 | Kindlund et al. | 210/107 |

FOREIGN PATENT DOCUMENTS

| | | |
|---|---|---|
| GB | 939975 | 10/1963 |
| WO | WO 9502442 A1 * | 1/1995 |
| WO | WO 2006056649 A1 * | 6/2006 |

OTHER PUBLICATIONS

Written Opinion mailed Apr. 21, 2006 in PCT/FI2005/000507.
Richard L. Headlley, "New Liquor Filtration Options Provide Production and Quality Improvements", Oct. 14, 2008, pp. 1-4.
Handbook: Chemical Pulping, Book 6B, Papermaking Science and Technology, six pages.

* cited by examiner

METHOD AND APPARATUS FOR THICKENING LIME MUD IN A DISC FILTER

This application is the US national phase of international application PCT/FI2005/000507 filed 24 Nov. 2005 which designated the U.S. and claims benefit of FI 20041518, dated 25 Nov. 2004, the entire content of which is hereby incorporated by reference.

The present invention relates to a method of and an apparatus for thickening lime mud slurry being generated in a causticizing process in a pulp mill, which method and apparatus utilize a disc filter.

It is known that lime mud filtering utilizing a disc filter may be carried out in the following way. A solution of this kind is disclosed in publication U.S. Pat. No. 5,900,158 (FI 96281). The lime mud slurry is pumped via a feeding conduit or feeding conduits into a distributor pipe, wherein the lime mud is maintained in homogenous form by means of mixing members. From the distributor pipe the lime mud slurry is distributed evenly into the troughs of filtering members, i.e. filter discs. Most usually, the filter discs rotate at atmospheric pressure, whereby the pressure difference required for the filtering is generated inside the discs formed of sectors by means of a suitable vacuum source, such as e.g. a suction leg, a vacuum pump or a centifugal pump, although it is also possible to pressurize the whole filter, whereby the discs would be surrounded by elevated pressure. Under the effect of partial vacuum, more generally pressure difference, a solid lime mud cake begins to accumulate on the surface of the wire-coated filter disc sectors. Scrapers are arranged on both sides of each filter disc, at a pre-determined distance from the surface of the sector, so that when the cake reaches an adequate thickness, the scrapers carve off the so-called surface cake formed onto the bottom cake, i.e. the so-called precoat-layer. The lime mud being removed falls onto a bet conveyor located below the filter discs, by means of which conveyor the lime mud is further conveyed e.g. into a lime kiln.

The filtrate removed from the lime mud under the effect of partial vacuum into the interior of the discs is led via a flow channel to a hollow central shaft of the filter and therefrom further into a filtrate container. From the filtrate container the filtrate is further pumped into the process.

The object of lime mud thickening is to complete the washing of lime mud coming from a white liquor filter from causticizing and to increase the dry solids content so that the lime mud can be fed into a lime kiln for combustion. The moisture content of the lime mud has a remarkable effect on the energy consumption of the kiln. Residual alkali has a significant effect on the environmental emissions (hydrogen sulfide emissions) of the lime kin. Variations in the properties of washed and thickened lime mud, i.e. dry solids content, residual alkali, particle size and structure, result in changes in the properties of burnt lime. For ensuring the production of high quality lime mud, the washing and thickening of the lime mud must be efficient. Therefore it may be necessary to treat the lime mud in two or more filtering devices instead of one, which is an expensive and space-consuming solution.

The object of the present invention is to provide a method and an apparatus for treating lime mud eliminating the above-mentioned disadvantages. Especially the object of the invention is to effect the lime mud treatment so that clean lime mud is produced economically and consuming less space compared to known methods. Tightening environmental regulations set certain limits also to emissions from lime kilns, and thus the lime mud to be combusted in the kiln has to be clean enough to fulfill these requirements.

In order to achieve these aims, the present invention is characterized in that the lime mud is treated in at least two stages in a disc filter so that the lime mud slurry entering the filter is fed on only a part of the filter discs, on which lime mud is thickened and removed from the discs, the removed lime mud is re-slurried in liquid, and the lime mud slurry thus obtained is fed onto a second part of the filter discs, on which lime mud is thickened and removed from the filter and led into a subsequent process stage.

According to an embodiment, filtrates obtained from different lime mud treatment stages are removed from the filter separately. Typically, at least part of the cleaner filtrate is used as washing liquid in a preceding washing stage in the flow direction of the lime mud, i.e. the filtrate is led countercurrently. This filtrate may also be circulated into the same stage for diluting the lime mud slurry. According to an embodiment, the filtrates may also be removed combined. In this case, too, part of the filtrate can be used for countercurrent washing, although the efficiency is not as high as in the previous case. The filtrate from the first stage or part of it or the filtrates from the first stages or part of them are led into a weak liquor container.

According to an embodiment, lime mud washing can be carried out in one or more disc filter treatment stages.

The invention also relates to an apparatus for treating lime mud slurry, said apparatus comprising a shaft provided with one or more flow channels, a number of filter discs arranged thereon, the interior of which discs is combined to one or more flow channels of the shaft for discharging filtrates, and driving equipment for the shaft for rotating the shaft and the discs in the lime mud slurry, devices for feeding the lime mud slurry and devices for removing the thickened lime mud from the apparatus. A characteristic feature of the apparatus according to the invention is that it has at least two stages and that the apparatus comprises first feeding devices for feeding lime mud slurry, said devices being connected so that the lime mud slurry is fed into a first set of filter discs, first lime mud removing devices for removing the treated lime mud from the first set of filter discs, second feeding devices, which are connected to the first removing devices for leading the lime mud treated in the first set of filter discs into the second set of filter discs, and second lime mud removing devices for removing the lime mud treated in the second set of filter discs from the apparatus.

According to an embodiment, the shaft of the apparatus comprises a shaft pipe, the interior of which is provided with a partition for dividing the interior of the shaft into at least a first and a second compartment separated from each other for separate discharge of the filtrates from different sets of discs. Typically the interior of the shaft is provided with a smaller tube arranged between the and the end of the shaft, said tube being concentric with but having a smaller diameter than the shaft pipe, for discharging the filtrates from different compartments via said end of the shaft. The filtrates may also be discharged via different ends of the shaft According to an embodiment the filter discs are rotated in a surrounding basin containing lime mud slurry, which is provided with a partition for dividing the basin into compartments for different sets of discs. The partition is preferably transferable, which is advantageous, when it is desired to change the number of the discs in the lime mud treatment stages.

According to an embodiment the filter discs are rotated in troughs at least partly surrounding the filter discs, i.e. each disc has a respective trough.

According to an embodiment, the lime mud discharge devices comprise a conveyor arranged below the discs and provided with a transferable outlet for lime mud. This allows for changing the number of the discs between the sets of discs. Lime mud removal may also be implemented by arranging respective conveyours for different sets of discs. Preferably the conveyors used are drag-chain conveyors. Alternatively, the lime mud that has been treated in the first stage and is re-slurried for feeding into the second stage, can be led into a slurrying tank e.g. via a drop chute, whereby the conveyor is used in the second stage only. The proper transfer technique for the lime mud is determined by e.g. the properties of the lime mud, the apparatus layout and other external requirements.

According to an embodiment, the filter discs of the first set are rotated in troughs at least partly surrounding the discs. A lime mud chute is located between the discs, where the lime mud is led to fall from the disc e.g. with a scraper. The lime mud chute is connected to a slurrying trough below the chute, which trough is coaxial with the filter and leads the time mud slurry to the second stage discs. The slurrying trough may extend essentially uninterrupted under each set of discs. The slurrying trough is provided with a mixer for facilitating the slurrying and for keeping the lime mud slurry uniform. The slurrying trough can also be a two-piece trough so that below each set of discs there is a respective trough, which communicates via a channel with the trough below the next set of discs for leading the lime mud slurry from the first set to the second set of discs individual troughs must have their respective mixers. The lime mud discharge devices comprise a conveyor arranged below the second set of discs for discharging the lime mud. An advantage of this embodiment is that no separate slurrying tank is needed.

Figure 2:
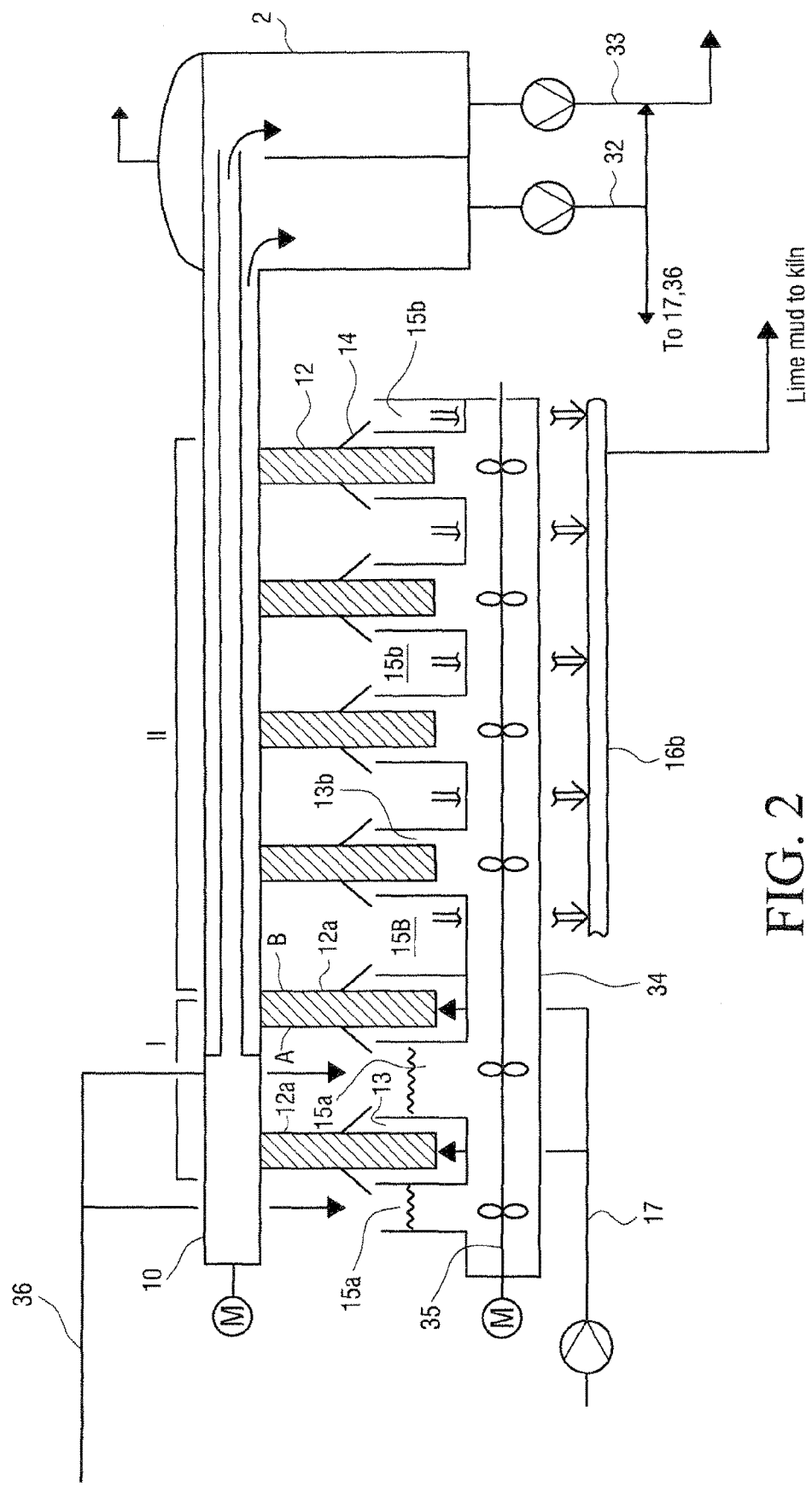

In the following, the method and the apparatus according to the invention are described in more detail with reference to the appended figures, of which FIG. 1 illustrates the disc filter arrangement according to the invention in a schematic cutaway drawing perpendicular to the filter axis, and FIG. 2 is a schematic illustration of a second disc filter arrangement according to the invention.

In accordance with FIG. 1, the disc filter arrangement according to the invention comprises a shaft 10 connected to driving equipment, such as a motor 11, said shaft being hollow or otherwise provided with flow channels, and radial filter discs 12 arranged on the shaft. The interior of each disc communicates with the interior of the shaft for discharging filtrates. The filter shaft 10 is supported at its ends and connected via bearings to a separate supporting frame, in connection with which said driving equipment is arranged.

In the described embodiment, the lower parts of each filter disc 12 are surrounded by a respective trough 13. The material being treated, i.e. lime mud slurry, extends to such a height in the trough 13 that the thickening lime mud can efficiently cover the surface of the disc. Usually, there is one trough 13 for each filter disc, although in some situations the use of a common single basin is advantageous. For example, the filter discs 12 may be rotated in a surrounding basin 38 containing lime mud slurry, which may provided with a partition 37 for dividing the basin 38 into compartments for different sets of discs 12. A scraper 14 is arranged in inclined position slightly above the liquid level of the trough 13 on both sides of each filter disc 12, by means of which scraper the material thickened on the surface of the discs is removed from the surface of each disc. Naturally the scrapers are located so that almost immediately after the scrapers have scraped the thickened lime mud cake off the surface of the disc, the surface freed of the lime mud again submerges into the slurry. From the scrapers 14 the thickened material is led into chutes 15 between the discs, which chutes are isolated from the troughs and wherefrom the material can fall into a conveyor 16 or corresponding transfer device, by means of which it is taken further. Naturally, it is also possible to remove the scraped-off material by other means.

According to the invention, the discs of the filter device are divided into at least two sets of discs, I and II, and thus the lime mud treatment can be carried out in two stages. The number of discs in each set is typically such that the first stage, wherein the more impure lime mud is treated, has the smaller number of discs. The reason for such distribution of the discs is that the dry solids content of the lime mud in the first stage is not as significant as the dry solids content of the lime mud entering the kiln.

Feeding devices 18 for the lime mud slurry are arranged at the bottom of the troughs 13, which feeding devices receive lime mud from feed lines 17 and 30. The feeding devices may comprise a dividing tube (not shown), which is described in publication U.S. Pat. No. 5,900,158 (FI 96281) and which extends to the whole length of the filter so that a feeding conduit 17 is located at the other end of the dividing tube, where the discs of the first set I are located. Preferably the dividing tube is provided with a mixing member, the purpose of which is to mix and transfer the lime mud slurry along the dividing tube evenly so that the lime mud slurry flows evenly into the troughs 13 for the discs. In the case of the invention, the dividing tube is provided with a partition for dividing the tube into two compartments, one for the set of discs I and the other for set II.

Preferably, a mixing db (not shown) is arranged on the outer circumference of each disc 12 so that it keeps the lime mud slurry on the bottom of the trough moving and thus prevents the lime mud from settling on the bottom of the trough. Preferably one or more washing nozzles 20 for each half of filter disc is/are arranged on the side of the disc, where the material thickened on the surface of the disc rises from the slurry, for washing the thickened material in order to wash off excess liquor from the lime mud cake.

The shaft 10 comprises a shaft pipe, the interior of which is provided with a partition 23 for dividing the interior into at least a first and a second compartment separated from each other for discharging the filtrates from different sets of discs I and II separately. The interior of the shaft 10 is provided with a smaller tube 25 arranged between the partition 23 and the end 24 of the shaft, said tube being concentric with but having a smaller diameter than the shaft pipe, for discharging the filtrates from different compartments via the same end, i.e. end 24 of the shaft. The filtrate from the first washing stage accumulates in compartment 26 and the filtrate from the second washing stage in compartment 27, which occupies in the shaft tube the space, which is left outside the inner tube 25. From compartment 26 the filtrate is discharged via inner tube 25, which communicates with compartment 26 via an opening in the partition. Preferably the partition 23 is transferable, which is especially advantageous, if it is desired to change the number of the discs belonging to the washing stages.

The apparatus according to the invention operates as follows: Lime mud slurry coming from the white liquor filter is fed via feed line 17 into feed conduits 18 for distributing the lime mud slurry evenly into troughs 13, which surround the bottom part of filter discs 12 of the first set of discs I. Under the effect of either hydrostatic pressure or partial vacuum arranged inside the filter discs 12, lime mud thickens on the wire surface of filter discs 12. During start-up and also after washing the wire surface of the filter discs 12 a so-called pre-coat layer is first thickened on the wire surface, the thickness of which is in practice dictated by the distance of the scraper 20 from the wire surface. The actual lime mud cake then thickens on the precoat-layer until the lime mud cake rises from the trough. Excess liquor may be washed off the lime mud cake by means of washing nozzles 20, which receive water via line 22. The drying of the lime mud cake is continued until the cake is cut off the surface of the pre-coat layer by means of scrapers 14 arranged on both sides of the filter disc 12. The liquid filtered off the lime mud is led via a central shaft 10, compartment 26 and inner tube 25 of the shaft into a filtrate tank 21.

The thickened lime mud is free to fall on a conveyor 16, which preferably is a drag-chain conveyor. In the lower part of the conveyor 16 there is a discharge opening 28, wherethrough the lime mud thickened in the first stage is discharged from the filtering device. Preferably the discharge opening is transferable, which is advantageous especially if it is desired to change the number of the discs of the washing stages. The discharged lime mud is further led via line 19 into a container 29, where the lime mud is re-slurried in essentially clean liquid, such as water. The lime mud slurry thus obtained is led via line 30 into a feed conduit 18 and further onto the discs of the second set II. The lime mud is treated in a corresponding way as in stage I. The treated lime mud is dropped on the conveyor 16 and further led into a lime kiln (not shown) for combustion.

It has been noted that it is possible to lead the lime mud from the white liquor filter directly to the lime mud filter and further to the lime kiln without any conventional lime mud bin, which typically is used as a storage tank.

The filtrate obtained in the second stage II accumulates from the disc interiors into compartment 27 of the shaft 10 and is led via the and of the shaft into the filtrate tank 21. The interior of the filtrate tank is divided by means of a partition 31 into two compartments, of which one is for the filtrate from stage I, and the other for filtrate from stage II. The filtrate from the second stage in line 32 is cleaner than the filtrate from the first stage I. The filtrate from the second stage can be used as washing/dilution liquid in the first stage and it is led into line 17, into thee lime mud slurry fed into the first stage, whereby the lime mud is diluted and thus cleaned. The filtrate from the first stage is typically led via line 33 into a weak liquor container and further e.g. into a smelt dissolving tank of the recovery boiler. Also the filtrate from the second stage or part of it may be taken into the weak liquor container.

FIG. 2 is a schematic illustration of another embodiment according to the invention, where the number of devices is smaller compared to the first alternative. In FIG. 2, only the lower part of the filter discs 12 on the shaft 10 is shown. A slurrying trough 34 is located beneath the first set of discs and the lime chutes 15a, via which slurrying trough the lime chutes of the first set communicate with each other. A long turbine mixer 35 or a corresponding mixer is arranged in the slurrying trough 34, which mixer is preferably arranged in elevation as close to said lime chutes as possible. Similar to FIG. 1, lime mud slurry coming from the white liquor filter is fed via feed line 17 into troughs 13 surrounding the bottom part of filter discs 12a of set I. The lime mud thickened on the discs 12a is removed from the surface of the discs by means of scrapers 14 and the lime mud falls into lime chutes 15a. Slurrying liquid is introduced into the lime chutes of the first set via line 36, and their liquid level is kept high. It is advantageous to locate at each chute a turbine of a mixer or a corresponding part of a mixer to keep the lime mud slurry in the trough uniform.

In the direction of the filter shaft 10, the slurrying trough 34 extends beneath the discs of the second set II also. So the trough communicates with troughs 13b surrounding the discs of the second set, and not with the lime mud chutes 15b. Thus, the line mud slurry slurried in the lime mud chutes of set I travels in the trough 34 in the axial direction of the mixer towards the troughs 13b of stage II and discs 12. The level in the line chutes 15a of stage I is kept so high (by adding dilution liquid 36), that the lime mud slurry is transferred into stage II. This way, the lime mud is thickened from the troughs 13b onto the discs 12 of the second stage. The lime mud removed by means of scrapers falls into lime mud chutes 15b between the discs and further onto conveyor 16b beneath the chutes, which conveyor preferably is a drag-chain conveyor.

The lime mud thickened on the surface of the inner disc of the first stage falls from surface A into the lime mud chute of stage I and from the second surface B into the lime mud chute of stage II. The lime mud chute 15B on the disc side B may be provided with a partition construction so that the lime mud falling from the surface B is directed into the slurrying trough 34.

In FIG. 2 the slurrying/feeding trough 34 extends beneath the discs of both stage I and stage II. The uninterrupted slurrying/feeding trough may also be a two-piece construction, whereby each set of discs has a respective trough, which are connected via a channel or corresponding for leading the lime mud slurry from stage I to stage II. The first stage trough, acting as slurrying trough, may be located higher than the second stage trough, which acts as a feeding trough. Each trough has a respective mixer. A schematic representation of a two-piece trough and its associated channel is shown by reference numerals 40 and 39, respectively, in FIG. 2.

Similar to the embodiment of FIG. 1, the second stage filtrate may be used as dilution/washing liquid in the first stage, and it is led into line 17, into the lime mud slurry being fed into the first stage. In FIG. 2, part of the filtrate from stage I may be led into line 36 and thus be used for slurrying the lime mud being removed from the discs in stage I. The first stage filtrate is typically led via line 33 into a weak liquor tank and further e.g. into a smelt dissolving tank of the recovery boiler. Also the second stage filtrate or part of it may be taken into the weak liquor tank. The filtrate from stage II may be used in some of the above-mentioned locations wholly or partly.

An advantage of the apparatus of FIG. 2 is that the slurrying tank 29 of FIG. 1 (which may also act as storage tank, if needed) is not needed, but the corresponding slurrying is effected in the lime mud chutes of the first stage and the trough 34 beneath them. Further. there is no storage tank between stages I and II, so that the feed remains uniform trough the filtering device.

In the above, a two-stage lime mud filter has been described, but in a corresponding way the number of stages may be more than two.

As noted from the above, a new type of disc filter apparatus for thickening lime mud has been developed. This allows the production of high quality lime mud to be used as raw material for the lime kiln. In known cases, lime mud has been thickened in two and even more sequential filters. In accordance with the invention, multistage thickening of lie mud is carried out in a single apparatus, which results in remarkable savings due to decreased apparatus and space requirement.

Only a few preferable embodiments of the filter according to the invention have been presented in the above, which are by no means meant to limit our invention from what is presented in the appended claims, which alone determine the scope of our invention.

The invention claimed is:

1. A method of treating lime mud slurry being generated in a causticizing process at a pulp mill comprising the steps of:
   (a) feeding a lime mud slurry generated in the pulp mill causticizing process to a disc filter;
   (b) thickening the lime mud slurry on filter discs of the disc filter;
   (c) removing the thickened lime mud from the filter discs; and
   (d) leading the thickened lime mud removed from the filter discs to a lime kiln, wherein
   the process includes treating the lime mud slurry in at least two filter treatment stages in one and the same disc filter by the steps comprising:
      (i) providing the disc filter with first and second sets of filter discs associated with first and second filter treatment stages, respectively, such that the first set has a lesser number of filter discs as compared to the number of filter discs in the second set;
      (ii) feeding the lime mud slurry entering the filter onto only the first set of filter discs of the first filter treatment stage so as to obtain a first thickened lime mud therefrom,
      (iii) removing the first thickened lime mud from the first set of filter discs of the first filter treatment stage,
      (iv) re-slurrying the first thickened lime mud which is removed from the first set of filter discs of the first filter treatment stage in liquid to obtain a re-slurried lime mud therefrom,
      (v) feeding the re-slurried lime mud onto second set of filter discs of the second filter treatment stage to obtain a second thickened lime mud therefrom, and
      (vi) removing the second thickened lime mud from the second set of filter discs of the second filter treatment stage and leading the removed second thickened lime mud to the lime kiln.

2. A method according to claim 1, further comprising separately removing filtrates obtained from the first and second filter treatment stages.

3. A method according to claim 1, further comprising removing filtrate from the second filter treatment stage, and using at least part of the filtrate removed from the second filter treatment stage as washing liquid/dilution liquid in the first filter treatment stage.

4. A method according to claim 1, further comprising removing filtrate from the first filter treatment stage, and directing at least part of the filtrate removed from the first filter treatment stage into a weak liquor tank.

5. A method according to claim 1, which comprises removing filtrates obtained from the first and second filter treatment stages as a combined filtrate stream.

6. An apparatus for treating lime mud slurry, said apparatus comprising:
   (a) a shaft provided with one or more flow channels,
   (b) a number of filter discs arranged on the shaft and divided into first and second sets associated with first and second filter treatment stages, respectively, such that the number of filter discs in the first set is less than the number of filter discs of the second set, the interior of the discs being connected to said one or more flow channels of the shaft for discharging filtrates,
   (c) driving equipment for the shaft for rotating the shaft and the filter discs in the lime mud slurry,
   (d) devices for feeding the lime mud slurry and re-moving thickened lime mud from the apparatus, and
   (e) a lime kiln for receiving the thickened lime mud, wherein
   the first filter treatment stage of the apparatus comprises:
      first devices for feeding lime mud slurry, which are connected so that the lime mud slurry is fed into the first set of filter discs of the first filter treatment stage,
      first discharge devices for discharging the treated lime mud from the first set of filter discs, and wherein
   the second filter treatment stage of the apparatus comprises:
      second feeding devices, which are connected to the first discharge devices for leading the lime mud treated in the first set of filter discs into the second set of filter discs of the second filter treatment stage, and
      second discharge devices for removing the lime mud treated in the second set of filter discs from the apparatus and directing the lime mud treated in the second set of filter discs to the lime kiln.

7. An apparatus according to claim 6, wherein the shaft comprises a shaft pipe, and a partition for dividing the interior of the shaft into at least a first compartment for the first set of filter discs and a second compartment for the second set of filter discs, the first and second compartments being separated from each other for separately discharging filtrates from the first and second sets of discs.

8. An apparatus according to claim 7, wherein the interior of the shaft is provided with a tube between the partition and an end of the shaft, said tube being concentric with but having a smaller diameter in relation to the shaft pipe, for discharging filtrates from different compartments through said end of the shaft.

9. An apparatus according to claim 7, wherein the partition is transferable.

10. An apparatus according to claim 6, wherein the second feeding devices comprise means for slurrying the lime mud discharged from the first set of discs.

11. An apparatus according to claim 6, wherein the filter discs are rotatable in a surrounding basin containing lime mud slurry and include a partition for dividing the basin into respective compartments for the first and second sets of discs.

12. An apparatus according to claim 6, wherein the filter discs are rotatable in troughs at least partly surrounding the filter discs.

13. An apparatus according to claim 10, wherein the second feeding devices comprise a slurrying tank, in which the lime mud discharged from the first filter treatment stage is slurried.

14. An apparatus according to claim 6, wherein the lime mud discharging devices comprise a conveyor arranged beneath the discs, and a transferable lime mud outlet so that the number of filter discs of the first and second sets may be changed.

15. An apparatus according to claim 6, wherein the first set of filter discs associated with the first filter treatment stage are rotatable in troughs at least partly surrounding the filter discs, and wherein the first discharge devices comprise a lime mud chute for leading the lime mud from the first set of filter discs, the lime mud chute communicating with a slurrying trough beneath the chute, and wherein the slurrying trough extends in the direction of the filter shaft and leads the lime mud slurry onto the second set of filter discs associated with the second filter treatment stage.

16. An apparatus according to claim 15, wherein the slurrying trough extends essentially uninterrupted beneath each of the first and second sets of filter discs.

17. An apparatus according to claim 15, wherein the slurrying trough has at least two parts so that a first part of the slurrying trough is located beneath the first set of filter discs and a second part is located beneath the second set of filter discs, said first part of the trough communicating with the second part of the trough via a channel for leading the lime mud slurry from the first set of filter discs onto the second set of filter discs.

18. An apparatus according to claim 15, wherein the lime mud discharging devices comprise a conveyor device arranged beneath the second set of filter discs for discharging the lime mud.

19. An apparatus for treating lime mud slurry, said apparatus comprising:
(a) a shaft provided with one or more flow channels,
(b) a number of filter discs arranged on the shaft and divided into first and second sets associated with first and second filter treatment stages, respectively, such that the number of filter discs in the first set is less than the number of filter discs of the second set, the interior of the discs being connected to said one or more flow channels of the shaft for discharging filtrates,
(d) first and second troughs at least partly surrounding the first and second sets of filter discs, respectively, to allow the filter discs to be rotatable therein,
(c) driving equipment for the shaft for rotating the shaft and the filter discs in the lime mud slurry,
(d) devices for feeding the lime mud slurry and re-moving thickened lime mud from the apparatus, and
(e) a lime kiln for receiving the thickened lime mud, wherein
the first filter treatment stage of the apparatus comprises:
first devices for feeding lime mud slurry, which are connected so that the lime mud slurry is fed into the first set of filter discs of the first filter treatment stage,
first discharge devices for discharging the treated lime mud from the first set of filter discs, and wherein
the second filter treatment stage of the apparatus comprises:
second feeding devices, which are connected to the first discharge devices for leading the lime mud treated in the first set of filter discs into the second set of filter discs of the second filter treatment stage, and
second discharge devices for removing the lime mud treated in the second set of filter discs from the apparatus and directing the lime mud treated in the second set of filter discs to the lime kiln, wherein
the second feeding devices comprise means for slurrying the lime mud discharged from the first set of discs, and wherein
the first and second discharging devices comprise a conveyor arranged beneath the discs, and a transferable lime mud outlet so that the number of filter discs of the first and second sets may be changed.

\* \* \* \* \*